US012802510B2

(12) United States Patent
Liu et al.

(10) Patent No.: US 12,802,510 B2
(45) Date of Patent: Nov. 17, 2026

(54) SIDE GUIDE ENHANCEMENT SYSTEM AND METHOD

(71) Applicant: Cardtronics USA, Inc., Atlanta, GA (US)

(72) Inventors: Zelin Liu, Angus (GB); Scott Low Colston, Dundee (GB); Matthew Bowen, Perth (GB); Callum Jacklin, Dundee (GB); Jamie Kenneth Stewart, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,328

(22) Filed: Dec. 31, 2024

(65) Prior Publication Data

US 2026/0188070 A1 Jul. 2, 2026

(51) Int. Cl.

| | |
|---|---|
| ***G07D 11/14*** | (2019.01) |
| ***B65H 1/06*** | (2006.01) |
| ***B65H 3/06*** | (2006.01) |
| ***G07D 11/16*** | (2019.01) |
| ***G07D 11/50*** | (2019.01) |

(52) U.S. Cl.

CPC ............... *G07D 11/14* (2019.01); *B65H 1/06* (2013.01); *B65H 3/063* (2013.01); *G07D 11/16* (2019.01); *G07D 11/50* (2019.01); *B65H 2402/442* (2013.01); *B65H 2402/45* (2013.01); *B65H 2405/114* (2013.01); *B65H 2405/321* (2013.01);

(Continued)

(58) Field of Classification Search

CPC ... B65H 1/06; B65H 1/14; B65H 1/26; B65H 3/063; B65H 3/66; B65H 3/68; B65H 9/04; B65H 9/06; B65H 2402/442; B65H 2402/45; B65H 2405/114; B65H 2405/321; B65H 2701/1912; G07D 11/14; G07D 11/16; G07D 11/165; G07D 11/17; G07D 11/245; G07D 11/50; G07D 2211/00

See application file for complete search history.

(56) References Cited

U.S. PATENT DOCUMENTS 4,883,183 A * 11/1989 Kimura .................. G07D 11/14 235/379
2005/0127590 A1 * 6/2005 Ugo ....................... G07D 11/14 271/96

(Continued)

FOREIGN PATENT DOCUMENTS

JP 2008129987 A * 6/2008 ............. G07D 11/14
JP 2020194386 12/2020

*Primary Examiner* — Prasad V Gokhale

(74) *Attorney, Agent, or Firm* — Schwegman Lundberg & Woessner, P.A.

(57) ABSTRACT

An automated teller machine and associated methods are disclosed. A device may include a pocket to receive bank notes. A device may include a stage plate, wherein the stage plate is moveable up and down within the pocket. A device may include a fascia located around the pocket on an exterior surface of the automatic teller machine. A device may include a shutter that is configured to slide in a slot between the pocket and the fascia. A device may include a side guide located on a side of the pocket, wherein the side guide includes a moveable tab, the moveable tab configured to occupy a portion of the slot when the shutter is retracted, and the moveable tab configured to retract from the slot when the shutter is extended to cover the pocket.

14 Claims, 6 Drawing Sheets

(52) U.S. Cl.
CPC .. *B65H 2701/1912* (2013.01); *G07D 2211/00* (2013.01)

(56) References Cited

U.S. PATENT DOCUMENTS

| | | | | |
|---|---|---|---|---|
| 2008/0142583 | A1 | 6/2008 | Yokoi et al. | |
| 2013/0015035 | A1 * | 1/2013 | Tanaka | G07D 11/14 194/206 |

* cited by examiner

SIDE GUIDE ENHANCEMENT SYSTEM AND METHOD

TECHNICAL FIELD

Embodiments described herein generally relate to automatic teller machines and associated methods. Specific embodiments described herein relate to recycling automatic teller machines and configurations related to a slot for receiving bank notes.

BACKGROUND

Automated Teller Machines (ATMs) have become indispensable in modern banking systems, providing convenient access to cash and other financial transactions. With increasing environmental awareness and operational efficiency demands, recycling ATMs have gained prominence. These machines are designed to allow the deposit, verification, sorting, and re-dispensing of banknotes, enabling the efficient reuse of cash within the system.

Traditional ATMs often relied on cash replenishment by bank personnel, with withdrawn banknotes exiting the cash cycle. In contrast, recycling ATMs reduce the need for external cash handling by accepting deposits, verifying their authenticity, and redistributing the deposited banknotes to subsequent users. This process reduces operating costs, minimizes the frequency of cash-in-transit activities, and contributes to sustainability by extending the utility of banknotes within a controlled environment.

The operation of recycling ATMs begins when a user inserts banknotes into a designated slot. The machine employs advanced sensors and counting mechanisms to authenticate the banknotes, ensuring they are genuine and meet specific quality standards. Authentic banknotes are then counted and categorized based on denomination, and those that fail authenticity or quality checks are segregated into a reject bin for further inspection.

The counting process is typically achieved through high-speed mechanisms, such as optical or magnetic sensors, which scan serial numbers, check for physical integrity, and assess security features like watermarks, holograms, and ultraviolet (UV) ink. Once counted and authenticated, the acceptable banknotes are either stored in dedicated cassettes for redistribution or securely held for deposit into the user's account. This dual functionality optimizes cash flow and enhances customer convenience by reducing the likelihood of ATM downtime due to cash depletion.

It is desired to improve reliability of a bank note receiving operation. An automatic teller machine and associated methods are shown that address reliability, and other technical challenges.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
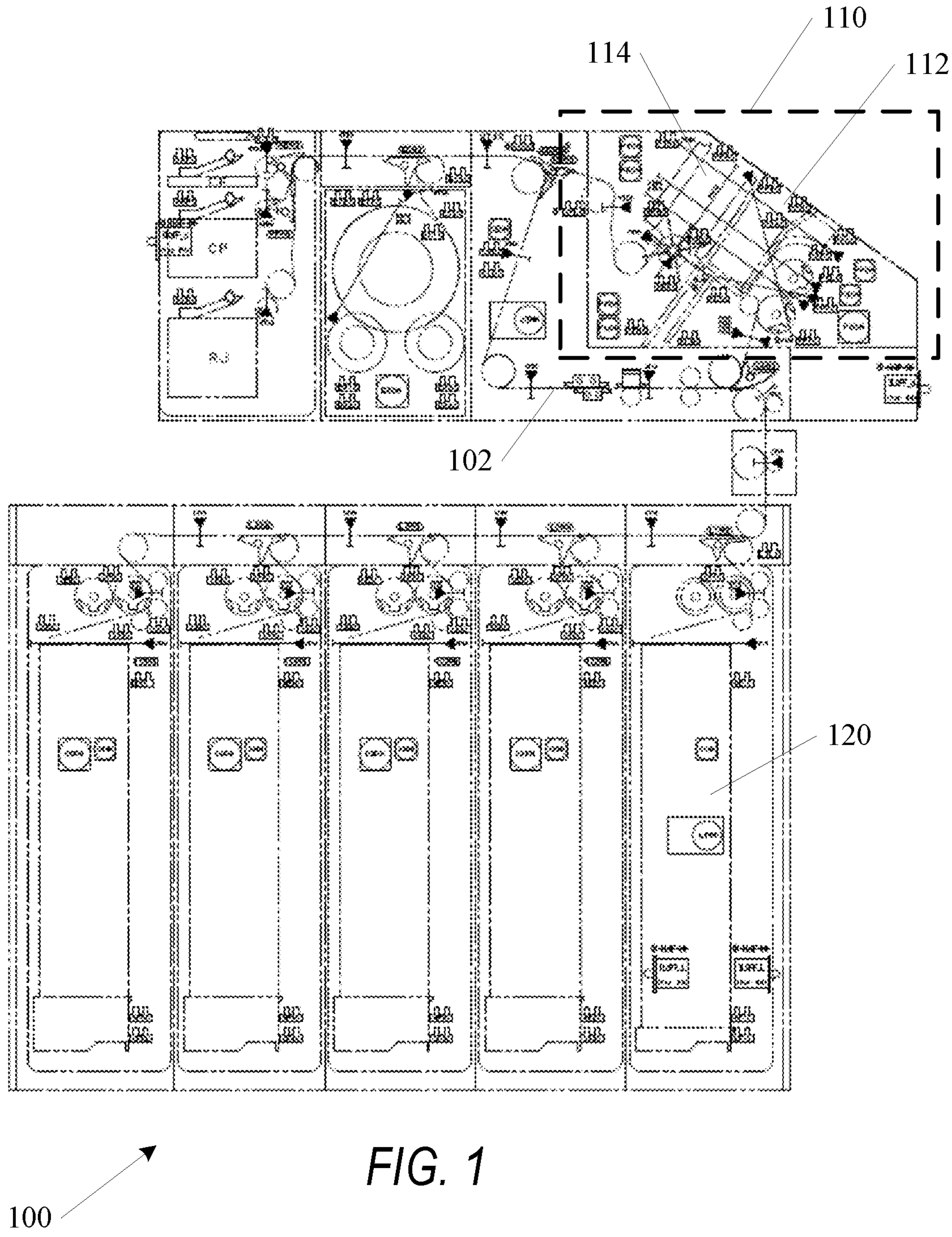
FIG. 1 shows a schematic of an automatic teller machine in accordance with some example embodiments.

FIG. 1 shows an automatic teller machine 100 according to one example. The automatic teller machine 100 includes a pocket assembly 110. In the example of FIG. 1, the pocket assembly 110 is divided into a bottom compartment 112 and a top compartment 114. The pocket assembly 110 serves as the primary area for receiving and processing bank notes within the automatic teller machine 100. The bottom compartment 112 and the top compartment 114 are designed to facilitate the movement and storage of bank notes during various stages of a transaction process.

One or more note storage compartments 120 are shown. A belt 102 or other transport system is coupled between various components in the pocket assembly 110 and the note storage compartments 120. The note storage compartments 120 are connected to the pocket assembly 110 and provide a secure location for storing bank notes after they have been processed. The note storage compartment 120 ensures that bank notes are kept in an organized manner, ready for future transactions or for collection by authorized personnel. The connection between the pocket assembly 110 and the note storage compartment 120 allows for efficient transfer and storage of bank notes within the automatic teller machine 100.

Figure 2A:
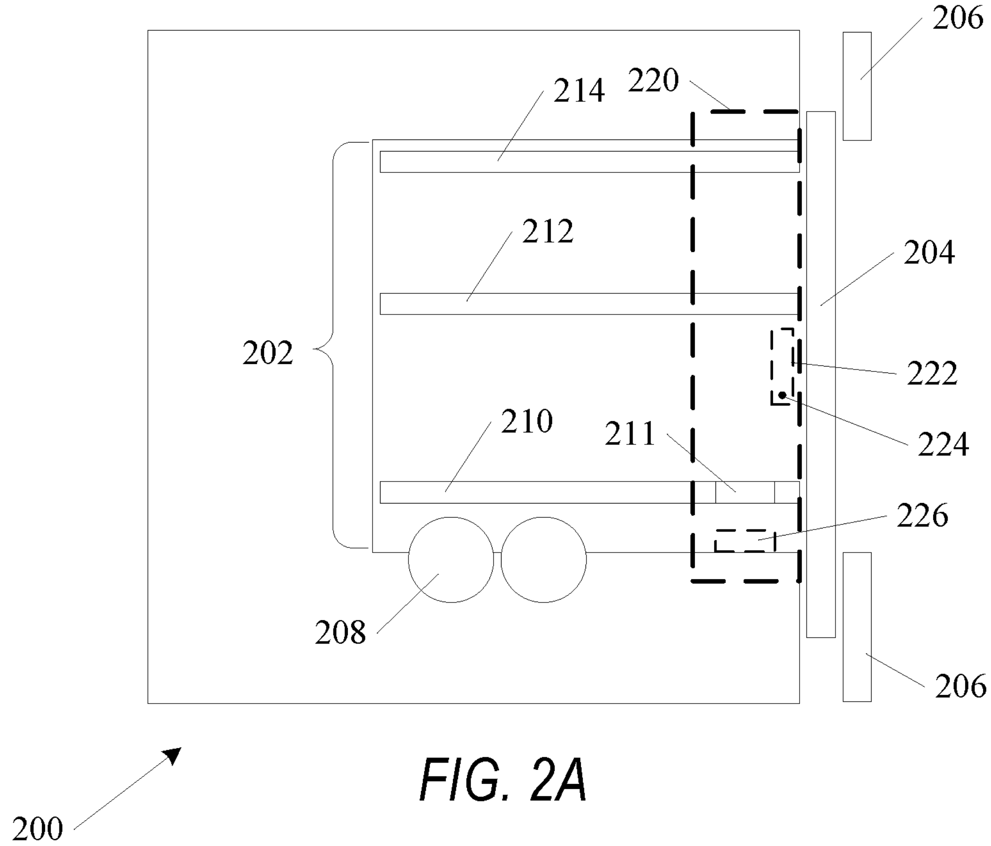
FIG. 2A shows a block diagram of a pocket of an automatic teller machine in accordance with some example embodiments.
Figure 2B:
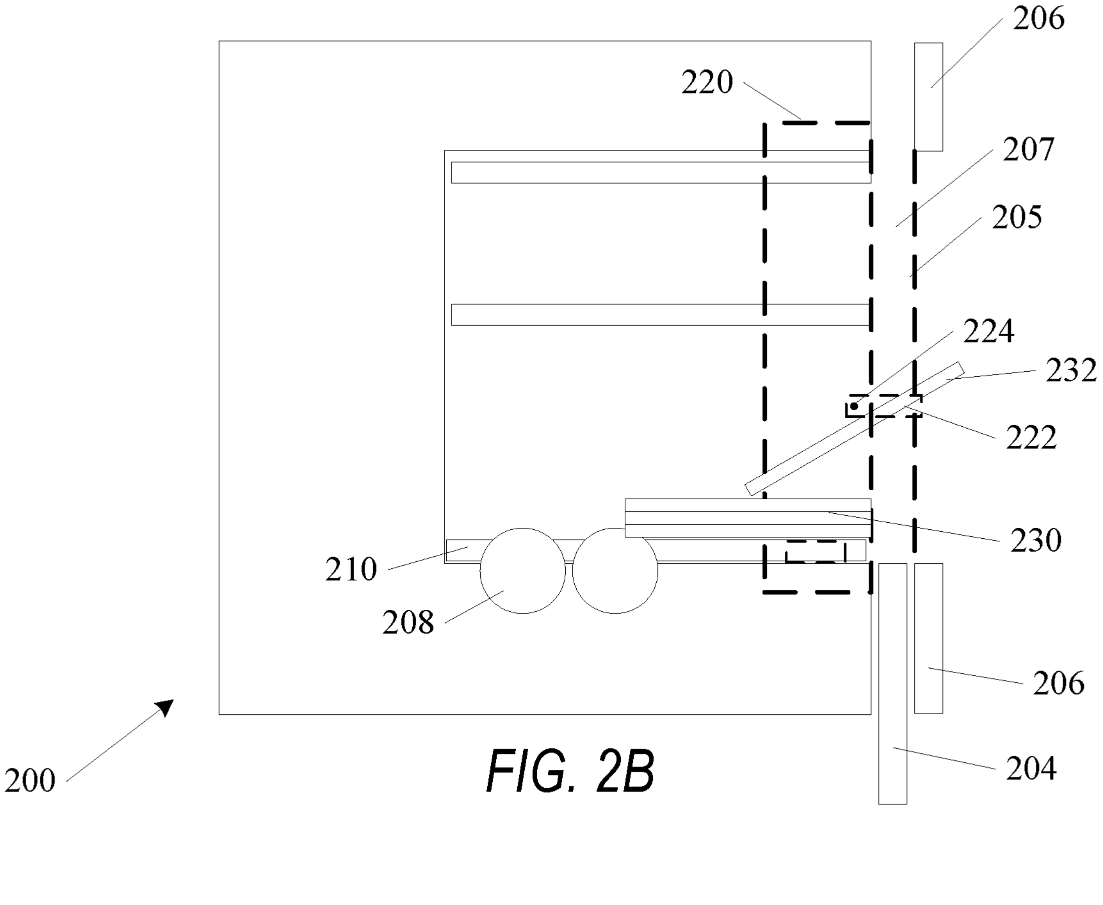
FIG. 2B shows another block diagram of a pocket of an automatic teller machine in accordance with some example embodiments.

FIGS. 2A and 2B show a pocket assembly 200 similar to the pocket assembly 110 from FIG. 1. In FIG. 2A, a shutter 204 is shown in a closed position, covering a pocket 202. The pocket assembly 200 includes a pocket 202, which serves as the primary area for receiving bank notes. The fascia 206 is located on an exterior surface of the automatic teller machine, surrounding the pocket 202 and providing an interface for users. In the examples of FIGS. 2A and 2B, within the pocket 202, a stage plate 210 is shown, which is moveable up and down to facilitate the handling of bank notes.

In the position shown in FIG. 2A, the stage plate 210 and a pusher plate 212 define a bottom compartment, similar to the bottom compartment 112 from FIG. 1. In operation, a stack of bank notes 230 is inserted onto the stage plate 210 and the stage plate is lowered as shown in FIG. 2B. One or more rollers 208 protrude through the stage plate 210 in FIG. 2B and are used to transport individual notes 232 within the automatic teller machine. In one example, the pusher plate 212 is also lowered to apply pressure to the stack of bank notes 230 while the rollers 208 engage the stack, although not shown in FIG. 2B.

In one example, the stage plate 210 includes a cutout 211 shaped to engage a side tab 226. In one example, when aligned with the cutout 211, the side tab 226 extends across a gap between the stage plate and a side guide 220. In one example, the side tab 226 and the cutout 211 are aligned when the stage plate 210 is in a bottom of the pocket 202. Other locations in the range of motion of the stage plate 210 where the side tab 226 and the cutout 211 can be aligned includes a location to accept bank notes, such as the position shown in FIG. 2A. An example of a side tab and a cutout are further discussed with respect to FIG. 6 below.

Above the stage plate 210, a pusher plate 212 is located, which is also moveable up and down within the pocket 202 to press bank notes against the stage plate 210. A top plate 214 is positioned above the pusher plate 212. In one example, the top plate 214 is also moveable up and down within the pocket 202.

A slot 207 is included to guide the shutter 204 between an extended position (shown in FIG. 2A) and a retracted position (shown in FIG. 2B). An edge of the slot 207 is shown by dashed line 205, and the slot 207 is located between the pocket 202 and the fascia 206 of the automatic teller machine.

On the side of the pocket 202, a side guide 220 is present, which includes a moveable tab 222. The moveable tab 222 is configured to occupy a portion of the slot 207 when the shutter 204 is retracted. The moveable tab 222 is further configured to retract from the slot 207 when the shutter 204 is extended to cover the pocket 202. The moveable tab 222 is connected to a tab pivot 224, allowing it to move as needed.

In FIG. 2B, the shutter 204 is shown in the open position, allowing access to the pocket 202. A lower portion of the shutter 204 in FIG. 2B is omitted for ease of illustration. The pocket assembly 200 includes the same components as described in FIG. 2A. However, in FIG. 2B, the shutter 204 is retracted, and the moveable tab 222 pivots over the slot 207. This configuration prevents bank notes from accidentally becoming jammed in the slot 207 between the pocket 202 and the fascia 206. In FIG. 2B, individual bank note 232 is shown being received onto the stage plate 210, which is in the bottom of the pocket 202. The moveable tab 222, connected to the tab pivot 224, extends into the slot 207 to block any potential gaps. In one example, the moveable tab 222 is biased to a location. In one example, a biasing device includes a spring. In one example, the moveable tab 222 is biased to normally occupy a portion of the slot 207, as shown in FIG. 2B.

Figure 3:
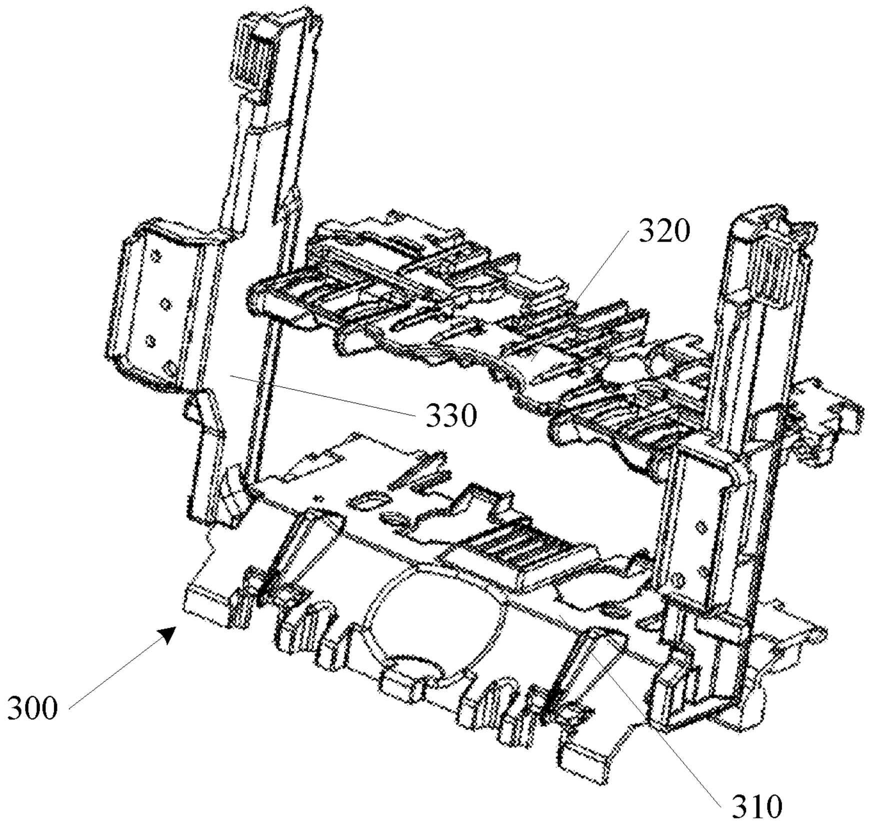
FIG. 3 shows an isometric view of a portion of a pocket assembly of an automatic teller machine in accordance with some example embodiments.
Figure 4:
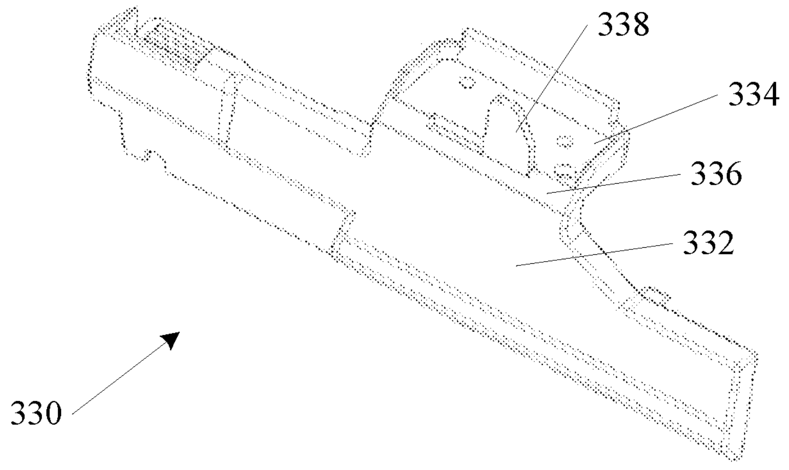
FIG. 4 shows a side guide of an automatic teller machine in accordance with some example embodiments.

FIG. 3 shows a pocket assembly 300 similar to pocket assembly 200 and 110 discussed above. The example of FIG. 3 shows a side guide 330 on a side of a pocket. A stage plate 310 is shown with a pusher plate 320 located above the stage plate 310 and defining a lower compartment in the pocket assembly 300. FIG. 4 shows the side guide 330 isolated from the pocket assembly 300 of FIG. 3. The side guide 330 includes a side surface 332, a front surface 334 and an entry corner 336 between the side surface 332 and the front surface 334. To further facilitate reliability of placing bank notes into the pocket assembly 300, the side surface 332 of the side guide 330 extends continuously along a range of motion of the stage plate 310. Also, to further facilitate reliability of placing bank notes into the pocket assembly 300, the entry corner 336 of the side guide 330 includes a chamfer between the front surface 334 of the side guide 330 and the side surface 332 of the side guide 330 along the range of motion of the stage plate 310. In one example, the chamfer includes a 45-degree chamfer. Other angles apart from 45-degrees are also within the scope of the present disclosure. The chamfer helps to guide bank notes into the pocket, and to reduce an opportunity for bank notes to catch, or otherwise become deflected by a sharp edge on the side guide 330. In one example, the entry corner 336 includes an arc instead of a chamfer to ease a transition between the side surface 332 and the front surface 334.

Figure 5A:
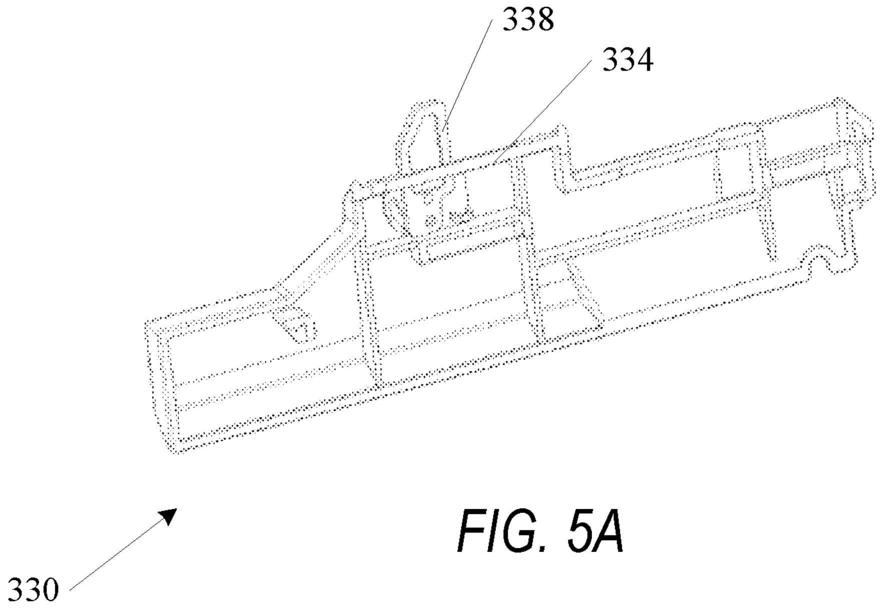
FIG. 5A shows a side guide of an automatic teller machine in accordance with some example embodiments.
Figure 5B:
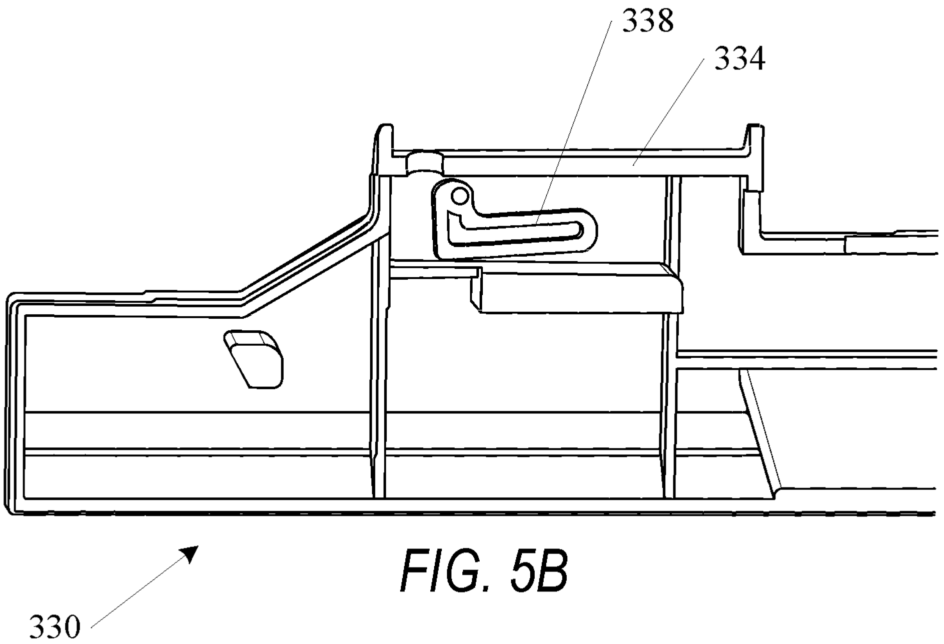
FIG. 5B shows the side guide of FIG. 5A in accordance with some example embodiments.

FIGS. 5A and 5B show operation of a moveable tab 338, similar to the moveable tab 222 from FIGS. 2A-2B. FIG. 5A shows the side guide 330, and a moveable tab 338 in relation to the front surface 334. In the orientation shown in FIG. 5A, the moveable tab 338 is in an extended orientation that will occupy a portion of the slot 207 when the shutter 204 is retracted. In the orientation shown in FIG. 5B, the moveable tab 338 is in a retracted orientation that allows the shutter 204 to close over the pocket 202. As noted above, the moveable tab 338 may include a spring or other biasing device to bias the moveable tab 338 in one orientation or another, although the spring is not shown in FIGS. 5A-5B.

Figure 6:
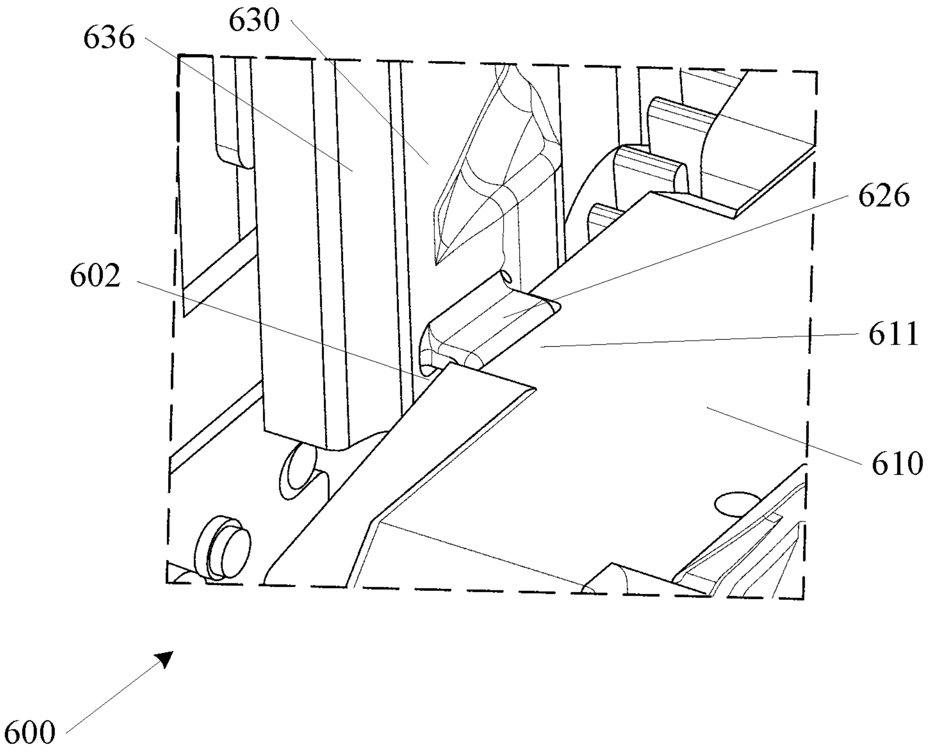
FIG. 6 shows an isometric view of a portion of a pocket assembly of an automatic teller machine in accordance with some example embodiments.

FIG. 6 shows a pocket assembly 600 similar to pocket assembly 300, 200, and 110 discussed above. The example of FIG. 6 shows a side guide 630 on a side of a pocket. A stage plate 610 is shown defining a lower compartment in the pocket assembly 600. In the example of FIG. 6, the stage plate 610 includes a cutout 611 shaped to engage a side tab 626. In one example, when aligned with the cutout 611, the side tab 626 extends across a gap 602 between the stage plate 610 and a side guide 630. In one example, the side tab 626 and the cutout 611 are aligned when the stage plate 610 is in a bottom of the pocket. Other locations in the range of motion of the stage plate 610 where the side tab 626 and the cutout 611 can be aligned includes a location to accept bank notes, such as the position shown in FIG. 2A. In one example, the side guide 630, side surface, entry corner 636, and side tab 626 are integrally formed. In one example, integral forming includes polymer molding or polymer machining. In one example integral forming includes forming using a fiber reinforced polymer.

Figure 7:
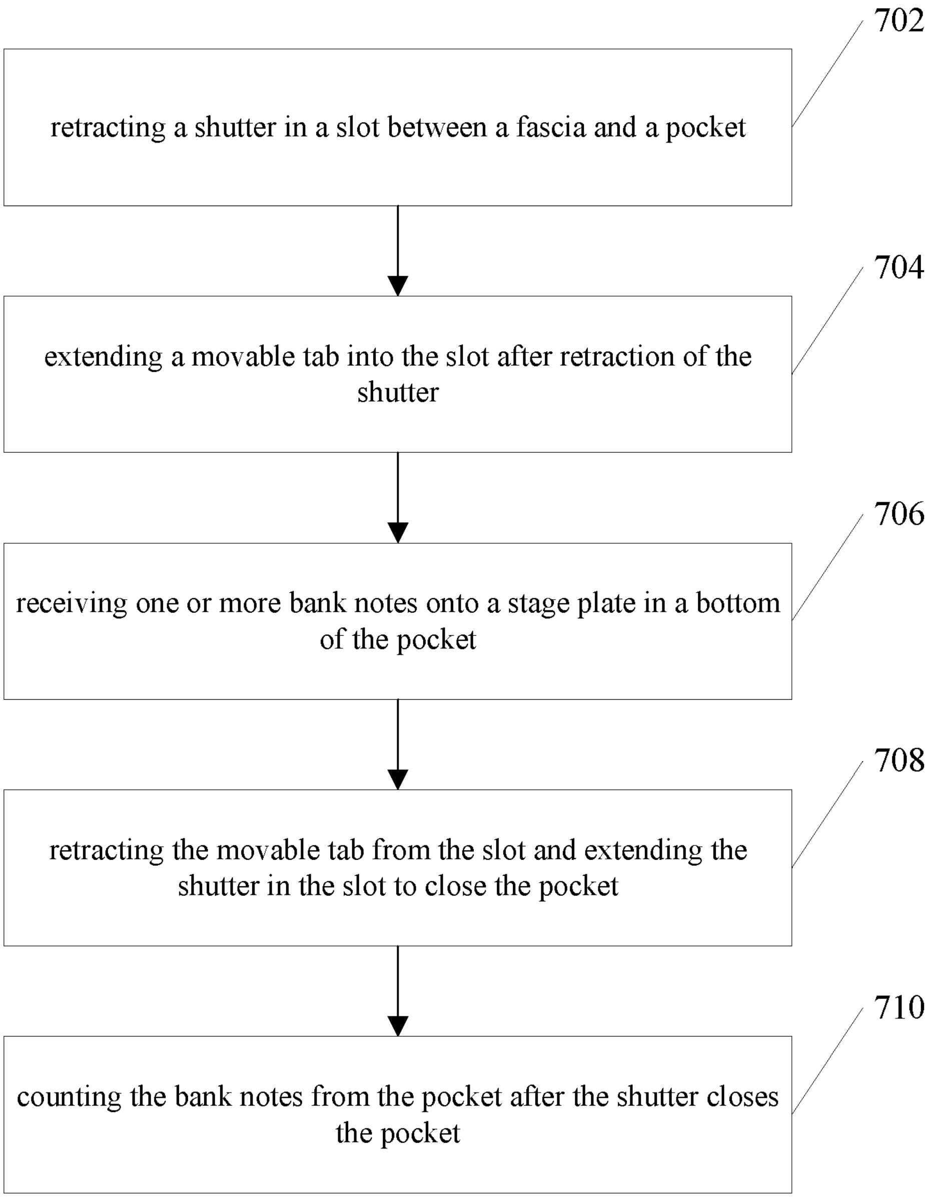
FIG. 7 shows a flow diagram of a method in accordance with some example embodiments.

FIG. 7 shows a flow diagram of an example method of operation. In operation 702, a shutter is retracted in a slot between a fascia and a pocket. In operation 704, a moveable tab is extended into the slot after retraction of the shutter. In operation 706, one or more bank notes are received onto a stage plate in a bottom of the pocket. In operation 708, the moveable tab is retracted from the slot and the shutter is extended in the slot to close the pocket. In operation 710, the bank notes from the pocket are counted after the shutter closes the pocket.

To better illustrate the method and apparatuses disclosed herein, a non-limiting list of embodiments is provided here:

Example 1. An automatic teller machine, comprising: a pocket to receive bank notes; a stage plate, wherein the stage plate is moveable up and down within the pocket; a fascia located around the pocket on an exterior surface of the automatic teller machine; a shutter that is configured to slide in a slot between the pocket and the fascia; and a side guide located on a side of the pocket, wherein the side guide includes a moveable tab, the moveable tab configured to occupy a portion of the slot when the shutter is retracted, and the moveable tab configured to retract from the slot when the shutter is extended to cover the pocket.

Example 2. The automatic teller machine of example 1, wherein the moveable tab is biased by a spring.

Example 3. The automatic teller machine of example 2, wherein the moveable tab is biased to normally occupy the portion of the slot.

Example 4. The automatic teller machine of example 1, wherein the side guide further includes a side tab that extends across a gap between the stage plate and the side guide when the stage plate is in a bottom of the pocket.

Example 5. The automatic teller machine of example 4, wherein a side surface of the side guide that is configured to contact bank notes extends continuously along a range of motion of the stage plate.

Example 6. The automatic teller machine of example 5, wherein an entry corner of the side guide includes a chamfer between a front surface of the side guide and the side surface of the side guide along the range of motion of the stage plate.

Example 7. The automatic teller machine of example 6, wherein the side guide, side surface, entry corner, and side tab are integrally formed.

Example 8. The automatic teller machine of example 1, further including a pusher plate located above the stage plate in the pocket, wherein the pusher plate is moveable up and down within the pocket.

Example 9. The automatic teller machine of example 1, further including rollers adjacent to a bottom of the pocket to engage bank notes when the stage plate in a location adjacent to the bottom of the pocket.

Example 10. A method of receiving bank notes in an automatic teller machine, comprising: retracting a shutter in a slot between a fascia and a pocket; extending a moveable tab into the slot after retraction of the shutter; receiving one or more bank notes onto a stage plate in a bottom of the pocket; retracting the moveable tab from the slot and extending the shutter in the slot to close the pocket; and counting the bank notes from the pocket after the shutter closes the pocket.

Example 11. The method of example 10, further including lowering the stage plate in the bottom of the pocket after extending the shutter in the slot to close the pocket.

Example 12. The method of example 11, further including lowering a pusher plate over the stage plate to press the one or more bank notes against the pusher plate.

Example 13. The method of example 12, further including actuating rollers adjacent to the bottom of the pocket to engage bank notes when the stage plate in a location adjacent to the bottom of the pocket.

Example 14. The method of example 10, wherein extending the moveable tab into the slot includes biasing the moveable tab with a spring.

Example 15. The method of example 10, wherein receiving one or more bank notes onto the stage plate includes aligning the one or more bank notes with a chamfer on an edge of a side guide.

Example 16. The method of example 10, further including blocking a gap between the stage plate and a side guide by aligning a side tab of the side guide within a cutout in the stage plate.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in response to detecting,” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context.

The invention claimed is:

1. An automatic teller machine, comprising:

a pocket to receive bank notes;

a stage plate, wherein the stage plate is moveable up and down within the pocket;

a fascia located around the pocket on an exterior surface of the automatic teller machine;

a shutter that is configured to slide in a slot between the pocket and the fascia; and a side guide located on a side of the pocket, wherein the side guide includes a moveable tab, the moveable tab configured to occupy a portion of the slot when the shutter is retracted, and the moveable tab configured to retract from the slot when the shutter is extended to cover the pocket, wherein the moveable tab is biased by a spring.

2. The automatic teller machine of claim 1, wherein the moveable tab is biased to normally occupy the portion of the slot.

3. The automatic teller machine of claim 1, wherein the side guide further includes a side tab that extends across a gap between the stage plate and the side guide when the stage plate is in a bottom of the pocket.

4. The automatic teller machine of claim 3, wherein a side surface of the side guide that is configured to contact bank notes extends continuously along a range of motion of the stage plate.

5. The automatic teller machine of claim 4, wherein an entry corner of the side guide includes a chamfer between a front surface of the side guide and the side surface of the side guide along the range of motion of the stage plate.

6. The automatic teller machine of claim 5, wherein the side guide, side surface, entry corner, and side tab are integrally formed.

7. The automatic teller machine of claim 1, further including a pusher plate located above the stage plate in the pocket, wherein the pusher plate is moveable up and down within the pocket.

8. The automatic teller machine of claim 1, further including rollers adjacent to a bottom of the pocket to engage bank notes when the stage plate in a location adjacent to the bottom of the pocket.

9. A method of receiving bank notes in an automatic teller machine, comprising:

retracting a shutter in a slot between a fascia and a pocket;

extending a moveable tab into the slot after retraction of the shutter, wherein extending the moveable tab into the slot includes biasing the moveable tab with a spring;

receiving one or more bank notes onto a stage plate;

retracting the moveable tab from the slot and extending the shutter in the slot to close the pocket; and counting the bank notes from the pocket after the shutter closes the pocket.

10. The method of claim 9, further including lowering the stage plate in a bottom of the pocket after extending the shutter in the slot to close the pocket.

11. The method of claim 10, further including lowering a pusher plate over the stage plate to press the one or more bank notes against the pusher plate.

12. The method of claim 11, further including actuating rollers adjacent to the bottom of the pocket to engage bank notes when the stage plate in a location adjacent to the bottom of the pocket.

13. The method of claim 9, wherein receiving one or more bank notes onto the stage plate includes aligning the one or more bank notes with a chamfer on an edge of a side guide.

14. The method of claim 9, further including blocking a gap between the stage plate and a side guide by aligning a side tab of the side guide within a cutout in the stage plate.

* * * * *